(12) United States Patent
Hinson et al.

(10) Patent No.: US 10,053,223 B2
(45) Date of Patent: Aug. 21, 2018

(54) AIRCRAFT REFUELING BOOM SOFT LIMITS SYSTEM

(71) Applicant: The Boeing Company, Chicago, IL (US)

(72) Inventors: Kimberly Hinson, Seattle, WA (US); Jung Soon Jang, Bellevue, WA (US); Richard Golob, Shoreline, WA (US); Justin Cleve Hatcher, Renton, WA (US); Jeffrey Lee Musgrave, Renton, WA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 14/793,331

(22) Filed: Jul. 7, 2015

(65) Prior Publication Data
US 2017/0008637 A1    Jan. 12, 2017

(51) Int. Cl.
*B64D 39/00*    (2006.01)

(52) U.S. Cl.
CPC ................................ *B64D 39/00* (2013.01)

(58) Field of Classification Search
CPC .................................................... B64D 39/00
See application file for complete search history.

(56) References Cited

U.S. PATENT DOCUMENTS

| 4,025,193 | A  | * | 5/1977  | Pond     | B64D 39/00 244/135 A |
| 5,785,276 | A  | * | 7/1998  | Ruzicka  | B64D 39/00 244/135 A |
| 7,469,863 | B1 | * | 12/2008 | Speer    | B64D 39/00 244/135 A |
| 7,472,868 | B2 | * | 1/2009  | Schuster | B64D 39/00 244/135 A |
| 7,681,839 | B2 | * | 3/2010  | Mickley  | G01S 1/70 244/135 A |
| 7,850,121 | B2 | * | 12/2010 | Powell   | B64D 39/00 244/135 A |
| 9,038,954 | B2 | * | 5/2015  | Hatcher  | B64D 39/06 244/135 A |
| 9,227,735 | B2 | * | 1/2016  | Kusnitz  | B64D 39/06 |
| 2014/0021300 | A1 |  | 1/2014  | Hatcher et al. | |

FOREIGN PATENT DOCUMENTS

| EP | 2349840 | 8/2011 |
| EP | 2370317 | 10/2011 |
| WO | WO2012030347 | 3/2012 |

\* cited by examiner

*Primary Examiner* — Brian M O'Hara
*Assistant Examiner* — Keith L Dixon
(74) *Attorney, Agent, or Firm* — Joseph M. Rolnicki; Evans & Dixon, L.L.C.

(57) ABSTRACT

A control system for an aircraft refueling boom controls the movements of the boom in certain areas in a total field of movement volume of possible boom movements based on the location of the boom in the total field of movement volume and based on the current rate of movement of the boom in the total field of movement volume.

20 Claims, 9 Drawing Sheets

AIRCRAFT REFUELING BOOM SOFT LIMITS SYSTEM

This invention is made with Government support under Contract No. KC-46 EMD FA8625-11-C-6600 awarded by the Department of Defense. The government has certain rights in this invention.

FIELD

This disclosure pertains to an aircraft refueling boom and the aspect of its control system that controls the movement of the aircraft refueling boom in certain areas in the total field of movement volume of possible boom movements based on the location of the boom in the total volume of possible boom movements, the operator input to the control system and the current rate of movement of the boom.

BACKGROUND

Aircraft refueling booms can be moved through a wide range of movement in response to operator input signals sent to the boom control system. The operator input signals are produced in response to manual manipulation of an input device by the operator of the boom. For example, an aircraft refueling boom can be controlled to move through a field of movement of the boom by an operator manually manipulating a joystick control device. The operator movement of the joystick forwardly or rearwardly would cause the control system to move the boom downwardly or upwardly, respectively. The operator movement of the joystick to the left or to the right would cause the control system to move the boom to the left or to the right, respectively.

The aircraft refueling boom field of movement through which the boom can be moved in response to input by the operator is limited in order to avoid damage to the boom, damage to the aircraft being refueled, and damage to the tanker aircraft from which the boom extends. For example, the aircraft refueling boom field of movement is limited by the soft limit control system of the boom to avoid the boom impacting with the fuselage of the tanker aircraft. Such an impact could damage the boom or the refueling nozzle of the boom. Furthermore, such an impact could result in the boom damaging the fuselage of the tanker aircraft. Thus, aircraft refueling boom control systems that oppose certain control signals produced by an operator's manual movement of a control device to avoid damage to the boom, the refueling nozzle and the tanker aircraft fuselage are desirable.

SUMMARY

The aircraft refueling boom soft limits control system of this disclosure controls movements of an aircraft refueling boom in response to control signals sent to the control system by an operator of the aircraft refueling boom. The control system controls the movements of the aircraft refueling boom within a total field of movement volume relative to the tanker aircraft deploying the boom. The total field of movement volume is a general conical volume that is defined by the length of the boom with the distal end of the boom being moved in a circle at the base of the conical volume and the proximal end of the boom connected to the tanker aircraft being at the apex of the conical volume. The total field of movement volume is surrounded by a movement limit threshold. The movement limit threshold is like an imaginary partition or wall that surrounds the total field of movement volume. The control system of the boom prevents the boom from crossing the movement limit threshold. The total field of movement volume is well spaced from the tanker aircraft fuselage or other structures of the tanker aircraft to avoid any damage to the tanker aircraft or the tanker aircraft structures resulting from the boom coming into contact with the tanker aircraft or the tanker aircraft structures.

The total field of movement volume has a central movement volume. In the central movement volume the movement of the boom is unrestricted. The central movement volume is also a general conical volume that is defined by the length of the boom when the distal end of the boom is moved in a circle at the base of the central movement conical volume with the proximal end of the boom connected to the tanker aircraft being at the apex of the central movement conical volume. In the central movement volume the control system of the boom controls the movements of the boom in response to the operator's manual movements of a control device, for example a joystick. The control system does not impose any restrictions on the movements of the boom in response to the operator's movements of the joystick. In the central movement volume, the boom is free to move to the left or right and upwardly or downwardly as viewed by the operator of the boom in response to the control signals sent to the control system by the operator's manual movements of the joystick. The central movement volume is surrounded by a restricted movement threshold. The restricted movement threshold defines the outer bounds of the central movement volume. The restricted movement threshold is like an imaginary conical partition or wall within the total field of movement volume that separates the central movement volume from the remainder of the total field of movement volume.

Surrounding the central movement volume and surrounding the restricted movement threshold is a restricted movement volume. The restricted movement volume is also a general hollowed conical volume that is larger than and surrounds the central movement volume. The restricted movement volume is positioned between the restricted movement threshold and the movement limit threshold. In the restricted movement volume, the control system places some restrictions on the movements of the boom resulting from the operator's manual movements of the joystick. For example, as the operator moves the joystick and sends input signals to the control system to cause the control system to move the boom from the central movement volume, through the restricted movement threshold and into the restricted movement volume, the control system senses the movement of the boom across the restricted movement threshold. The control system then opposes the operator's movements of the joystick and reduces or restricts the movement of the boom through the restricted movement volume in the direction of the boom chosen by the manual input of the operator.

Basically, the control system progressively slows down the movement of the boom through the restricted movement volume as the boom approaches the movement limit threshold surrounding the total field of movement volume. Should the operator continue to operate the joystick to control movement of the boom to the movement limit threshold, the control system prevents further movement of the boom in the direction of the movement limit threshold. In this way, the control system restricts the movement of the boom to contain the boom in the total field of movement volume where the boom is spaced well away from its mechanical limits, the tanker aircraft fuselage and/or a tanker aircraft structures, preventing potential impact of the boom with the tanker aircraft fuselage or structures.

In order to ensure that the control system prevents the boom from moving beyond the total field of movement volume and potentially reaching the boom's mechanical limits, contacting the tanker aircraft fuselage or structures of the tanker aircraft, the control system monitors the rate or speed at which the boom is controlled to move from the central movement volume, across the restricted movement threshold and into the restricted movement volume. By the control system monitoring the rate at which the boom moves from the central movement volume, through the restricted movement threshold and into the restricted movement volume, the control system can determine the force and amount of time required to overcome the inertia of the mass of the moving boom and control stopping of the boom movement as the boom reaches the movement limit threshold. For example, when the control system senses the boom moving at a first rate or speed of movement through the central movement volume and into the restricted movement area, the control system controls the actuators of the boom movement to exert a first force against the inertia of the boom for a first period of time to ensure that the movement of the boom through the restricted movement volume stops before the boom reaches the movement limit threshold. When the control system senses the boom moving at a second rate or speed of movement through the central movement volume and into the restricted movement volume, and the second rate of movement is larger than the first rate of movement, then the control system controls the actuators of the boom movement to exert a second force that is larger than the first force against the inertia of the boom movement for a second period of time to ensure that the boom stops moving through the restricted movement volume before the boom reaches the movement limit threshold.

By sensing the rate or speed of movement of the boom through the central movement volume, across the restricted movement threshold and into the restricted movement volume, the control system ensures that a sufficient stopping force will be exerted against the inertia of the boom moving through the restricted movement volume in sufficient time to stop the movement of the boom when the boom reaches the movement limit threshold.

The features, functions, and advantages that have been discussed can be achieved independently in various embodiments or may be combined in yet other embodiments, further details of which can be seen with reference to the following description and drawings.

DETAILED DESCRIPTION

Figure 1:
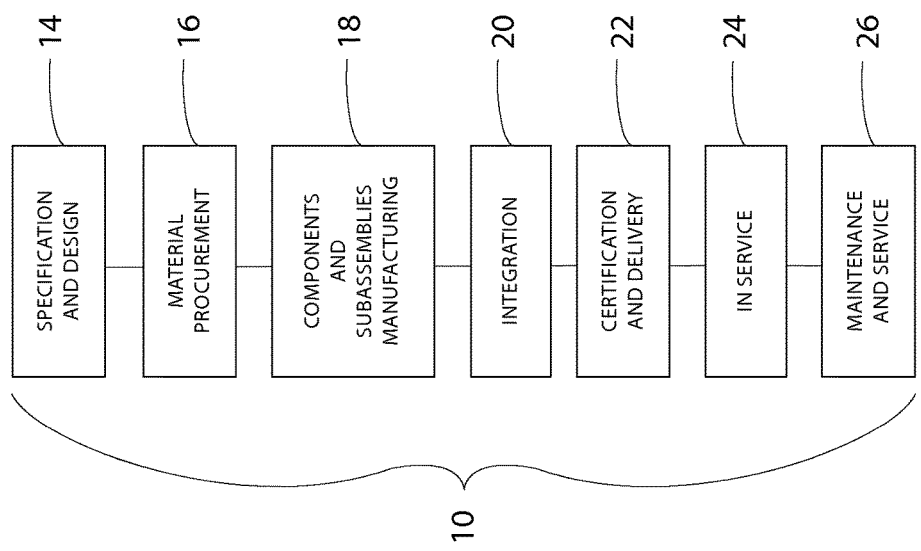
FIG. 1 is a flow diagram of aircraft production and service methodology.
Figure 2:
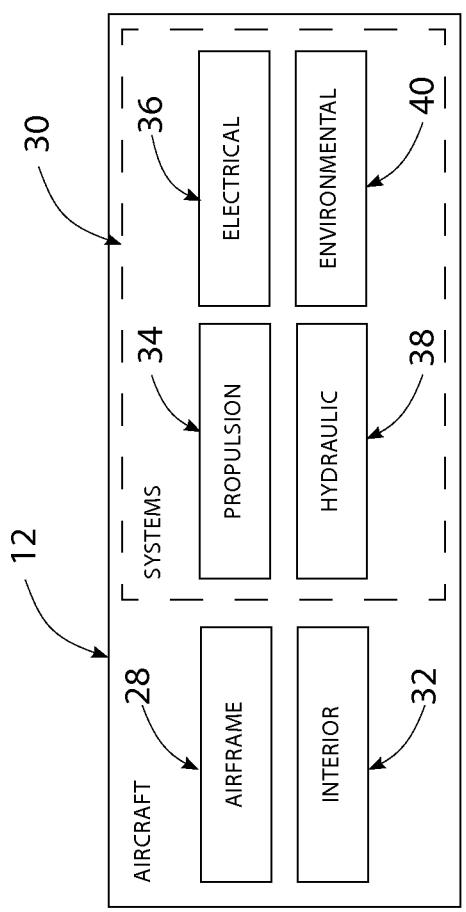
FIG. 2 is a block diagram of an aircraft.

Referring more particularly to the drawings, embodiments of the disclosure may be described in the context of an aircraft manufacturing and service method 10 as shown in FIG. 1 and an aircraft 12 as shown in FIG. 2. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may also include modification, reconfiguration, refurbishment, and so on).

Each of the processes of method 10 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 12 produced by exemplary method 10 may include an airframe 28 with a plurality of systems 30 and an interior 32. Examples of high-level systems 30 include one or more of a propulsion system 34, an electrical system 36, a hydraulic system 38, and an environmental system 40. Any number of other systems may be included. Although an aerospace example is shown (aircraft, rockets), the principles of the invention may be applied to other industries, such as the automotive, railroad or tooling industry.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

This disclosure pertains to an aircraft refueling boom and its control system that are similar to those disclosed in the international patent publication No. WO 2012/030347, which is assigned to the assignee of this application and is incorporated herein by reference.

Figure 3:
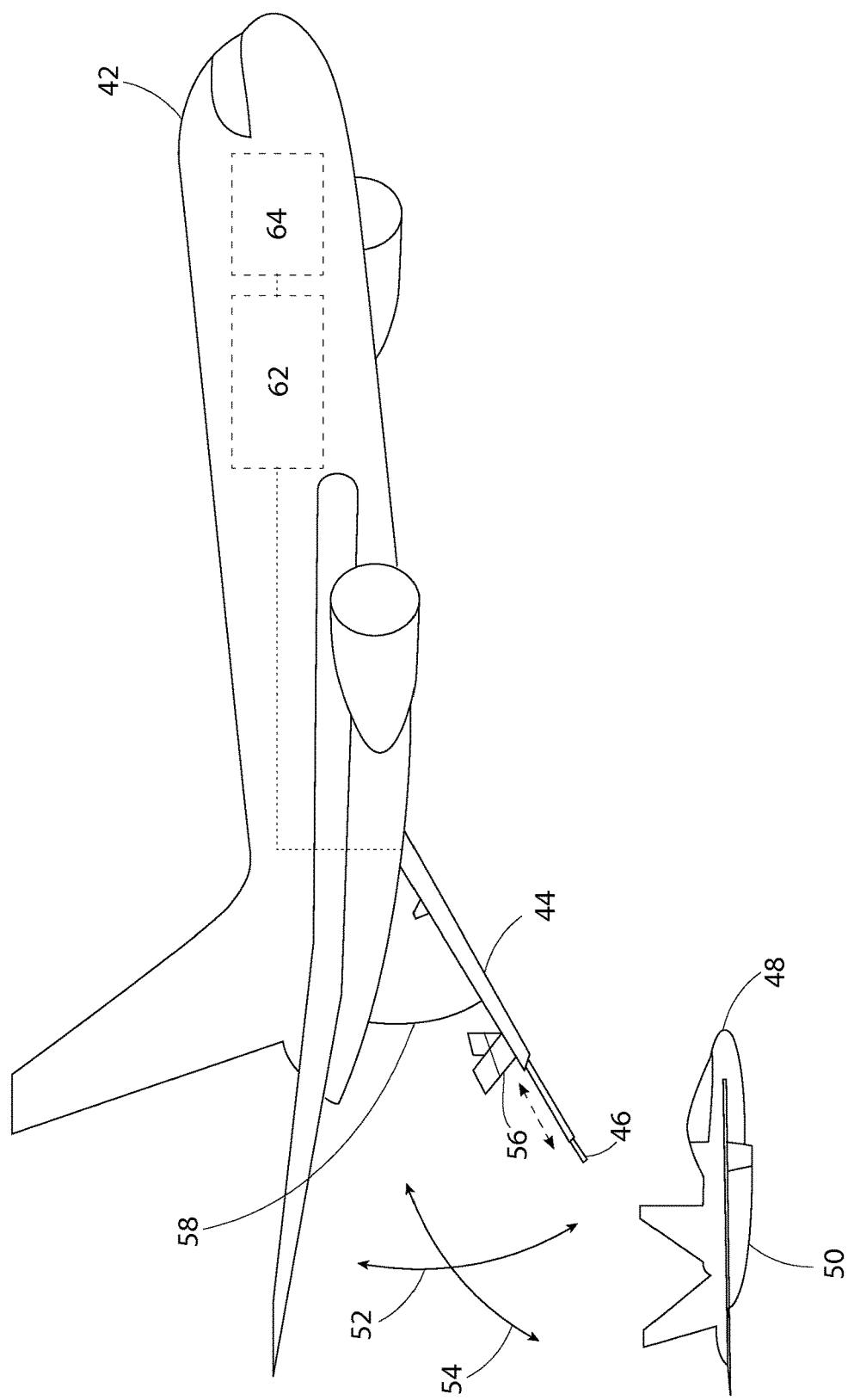
FIG. 3 is a representation of a perspective view of an aircraft supporting an aircraft refueling boom operated by the control system of this disclosure.

FIG. 3 is a representation of a tanker aircraft 42 having a refueling boom 44. The movements of the refueling boom 44 are controlled by the soft limits control system of this disclosure in response to control signals sent to the control system by an operator of the aircraft refueling boom. The boom supports a nozzle 46 that communicates with fuel tanks (not shown) inside the tanker aircraft 42. The boom 44 and the soft limits control system provide in-flight refueling to a refueling receiver 48 of a separate aircraft 50. The soft limits control system controls the movements of the boom 44 in an upward or downward direction as viewed by the boom operator in the aircraft and represented by the arrow 52, a left or right direction as viewed by the boom operator in the aircraft 42 and represented by the arrow 54, or a combination of these directions within a total field of movement volume relative to the tanker aircraft 42 deploying the boom 44. The soft limits control system controls the operation of rudders and elevator 56 on the boom 44 to move the boom 44 through the total field of movement volume.

Figure 4:
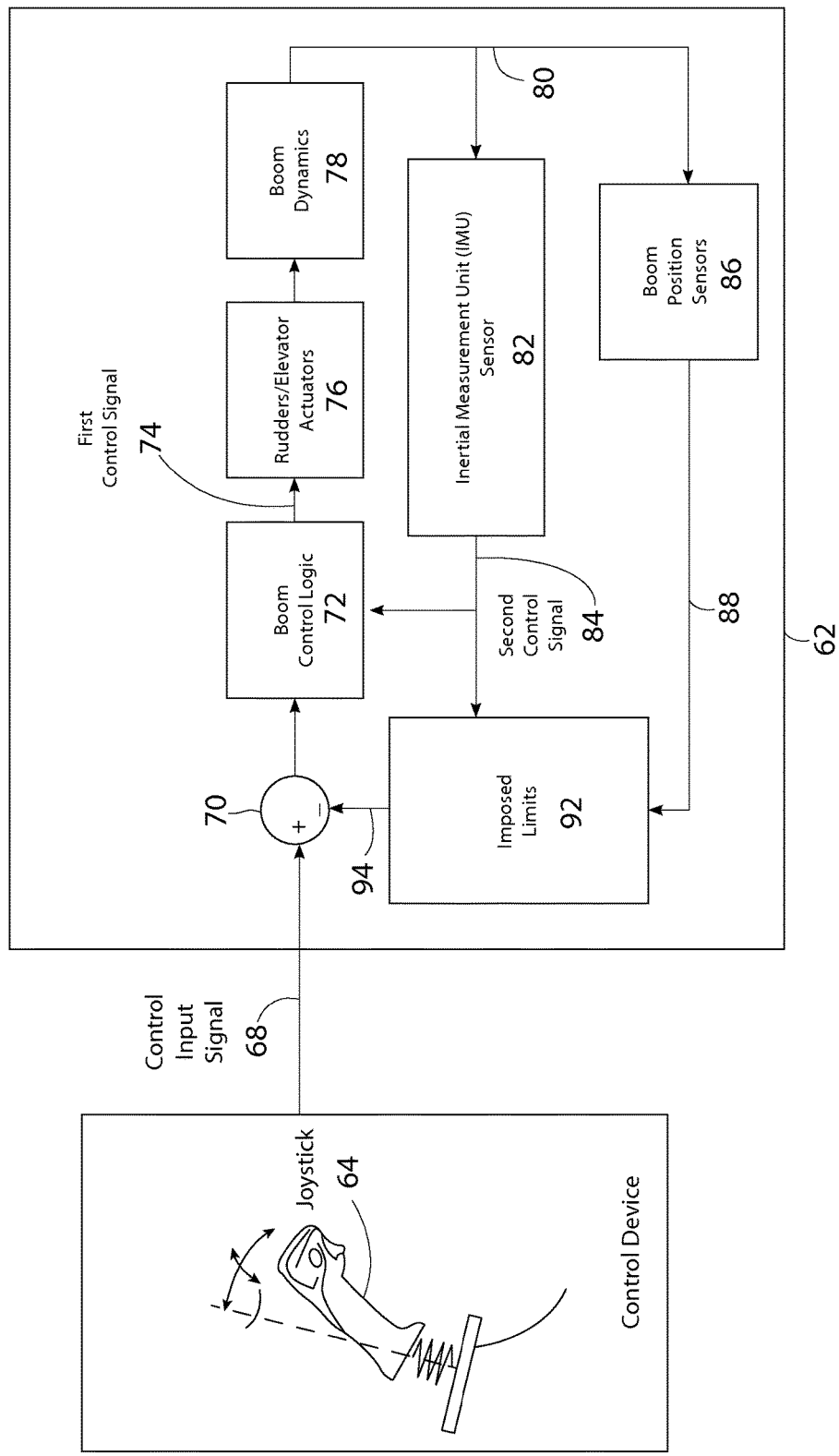
FIG. 4 is a representation of a block diagram of a manually operated control device and a control system that controls the movements of the aircraft refueling boom of this disclosure.

FIG. 4 is a representation of the soft limits control system 62 of this disclosure. As represented in FIG. 2, the soft limits control system 62 controls movements of the boom 44 in response to input signals received from a manual control device, such as a joystick 64 that is manually manipulated by an operator of the boom inside the aircraft 42. In response to the manual manipulation of the joystick 64, the soft limits control system 62 controls the rudders to move the boom left or right as represented by the arrow 54, or the elevator to move the boom 44 upwardly or downwardly along the arrow 52, or controls a combination of these movements.

During operation of the boom 44, situations can occur that are unexpected by the boom operator. Such situations can cause the boom operator to make manual movements of the joystick 64 that result in boom movements that could be dangerous to the tanker aircraft 42 or the refueling receiver 48 of the separate aircraft 50 being refueled by the tanker aircraft. For example, the boom operator could make movements of the joystick 64 that result in the boom being moved to a mechanical limit of the boom total field of movement where the boom has the potential for causing damage to itself, contacting and causing damage to the aircraft fuselage or a structure of the aircraft. The soft limits control system 62 is programmed to control the movements of the boom 44 in response to manual movements of the joystick 64 by the operator, and also to control the movements of the boom 44 that override control input signals from the joystick 64 and restrict movements of the boom that could potentially cause damage to the aircraft 42 and/or structures of the aircraft.

In response to the operator of the boom 44 making manual movements of the joystick 64, an input control signal 68 is sent from the joystick 64 to the soft limit control system 62. The input control signal 68 is received by a summing junction 70 of the soft limit control system 62. The summing junction 70 combines the input control signal 68 with a signal received from a feedback loop (to be described) and sends a signal to the boom control logic 72.

The boom control logic 72 includes fly by wire controller information that is used to determine a first control signal 74 that is output to the actuators 76 of the rudders and elevator 56. The first control signal 74 controls the actuators 76 to position the rudders and elevator 56 to control the up or down movements or left to right movements of the boom 44 desired.

The movement of the rudders and elevator cause the boom to move. The boom motion is sensed by the boom position sensors and one or more inertial measurement units.

The one or more inertial measurement unit sensors 82 generate a second control signal 84 as feedback to the boom control logic 72. The inertial measurement unit sensors 82 provide input regarding an actual angular rate and linear acceleration of movement of the boom 44.

Additionally, an output signal 80 from the boom dynamics 78 is provided to boom position sensors 86 which gather information on a position of the boom 44 relative to the aircraft 42. An output signal 88 from the boom position sensors 86 is also provided to imposed limits 92 which include logic governing imposed limits applied to the boom 44. For example, the imposed limits 92 of the control system 62 define a central movement volume in which there is unrestricted operator control of movements of the boom 44, a restricted movement volume that surrounds the central movement volume and in which the control system 62 imposes some restrictions on boom movements, and a movement limit threshold that surrounds the restricted movement volume and prevents further movement of the boom 44 beyond the movement limit threshold. An output signal 94 of the imposed limits 92 is fed back to the summing junction 70 where the output signal 94 of the imposed limits 92 offsets or negates at least a portion of the input control signal 68 generated by the boom operators movements of the joystick 64.

As further described with reference to FIGS. 5-10, when the boom 44 is operated in a central movement volume, the operator of the boom 44 may move the boom with full control and no restrictions. The central movement volume is a general conical volume that is defined by the length of the boom 44 when the distal end of the boom or nozzle 46 is moved in a circle at the base of the central movement conical volume with the proximal end of the boom 44 connected to the tanker aircraft 44 being at an apex of the central movement conical volume. In the central movement volume, the boom is free to move to the left or right and upwardly or downwardly as viewed by the operator of the boom in response to the input control signal 68 sent to the control system 62 by the operator's manual movement of the joystick 64. The central movement volume is surrounded by a restricted movement threshold. The restricted movement threshold defines the outer bounds of the central movement volume. The restricted movement threshold is like an imaginary conical partition or wall that surrounds the central movement volume. Surrounding the central movement volume and surrounding the restricted movement threshold is a restricted movement volume. When the boom 44 moves from the central movement volume, through the restricted movement threshold and into the restricted movement volume, the output signal 94 from the imposed limits 92 received at the summing junction 70 reduces or partially offsets the input control signal 68 so that a greater or more pronounced operator input is required at the joystick 64 to generate an input control signal 68 that may at least partially overcome the output signal 94 of the imposed limits 92 at the summing junction 70. When the boom 44 reaches the movement limit threshold that surrounds the restricted movement volume, the output signal 94 from the imposed limits 92 entirely offsets or blocks the input control signal 68. As a result, no matter to what extent the operator of the boom 44 moves the joystick 64 in the direction where the boom 44 has reached the movement limit threshold, the output signal 94 from the imposed limits 92 applied to the summing junction 70 cancels the control input signal 68.

Figure 5:
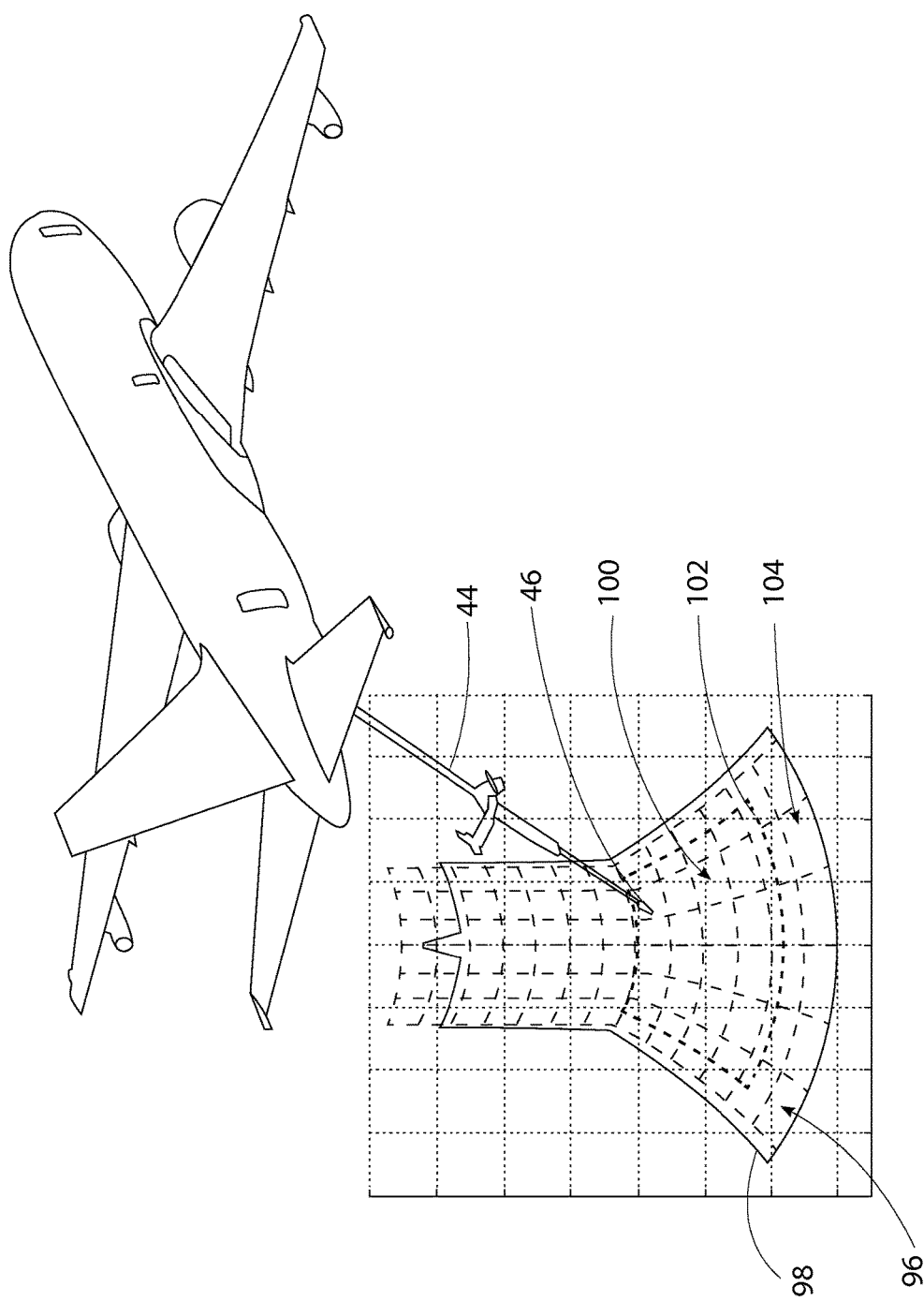
FIG. 5 is a representation of a diagram of the field of movement volume of the aircraft refueling boom, the central movement volume of the boom and the restricted movement volume of the boom controlled by the control system of this disclosure.

FIG. 5 is a representation of a total field of movement of the boom 44 relative to the aircraft 42 that is controlled by the control system 62. In FIG. 5, the total field of movement is represented by the solid line 96. Although the total field of movement 96 is shown in two dimensions in FIG. 5, it should be understood that the boom 44 and the nozzle 46 of the boom move in a three-dimensional volume. During refueling operations, the nozzle 46 of the boom 44 is moveable by the control system 62 in the volume having the general configuration of a truncated cone at the bottom of the total field of movement 96 shown in FIG. 5. The boom 44 moves through the volume having the general configuration of a cylinder at the top of the total field of movement volume 96 represented in FIG. 5. The solid line 96 represents a movement limit threshold in the control logic of the control system 62. The movement limit threshold 96 is like an imaginary partition or wall that surrounds the total field of movement volume. The control system 62 controls the movement of the boom 44 and prevents the boom 44 from crossing the movement limit threshold 98. The total field of movement volume 96 within the movement limit threshold 98 is well spaced from the tanker aircraft 42 to avoid any damage to the tanker aircraft 42 or tanker aircraft structures resulting from the boom 44 coming into contact with the tanker aircraft or the tanker aircraft structures.

The total field of movement volume 96 has a first, central movement volume 100. The central movement volume 100 is surrounded by a restricted movement threshold 102. The central movement volume 100 within the restricted movement threshold 102 has a general configuration of a truncated cone that is defined by the length of the boom 44 when the distal end or nozzle 46 of the boom is moved in a circle at the base of the truncated cone and with the proximal end of the boom connected to the tanker aircraft 42 being at the apex. In the central movement volume 100 defined by the restricted movement threshold 102, movement of the boom is unrestricted by the control system 62. In the central movement volume 100, the control system 62 controls movements of the boom 44 in response to the operator's manual movements of the joystick 64. The control system 62 does not impose any restrictions on the movements of the boom 44 in response to the operator's movements of the joystick 64. In the central movement volume defined by the restricted movement threshold 102, the boom 44 is free to move to the left or right and upwardly or downwardly as viewed by the operator of the boom in response to the input control signals 68 sent to the control system 62 by the operator's manual movements of the joystick 64. The restricted movement threshold 102 defines the outer bounds of the central movement volume 100. The restricted movement threshold 102 is like an imaginary partition or wall within the movement limit threshold 98 that separates the central movement volume 100 from the remainder of the total field of movement volume 96 within the movement limit threshold 98.

Surrounding the central movement volume 100 is a second, restricted movement volume 104. The restricted movement volume 104 is positioned outside of the central movement volume 100 and surrounds the central movement volume 100 and the restricted movement threshold 102. The restricted movement volume 104 extends from the restricted movement threshold 102 to the movement limit threshold 98. The restricted movement volume 104 is also a general hollowed conical volume that is larger than and surrounds the central movement volume 100 and the restricted movement threshold 102. In the restricted movement volume 104, the control system 62 puts some restrictions on the movements of the boom 44 resulting from the operator's manual movements of the joystick 64.

FIGS. 6-9 are representations of the movement of the aircraft refueling boom 44 through the total field of movement volume 96 in response to manual input to the joystick 64 where the boom movements are controlled by the control system 62.

Figure 6:
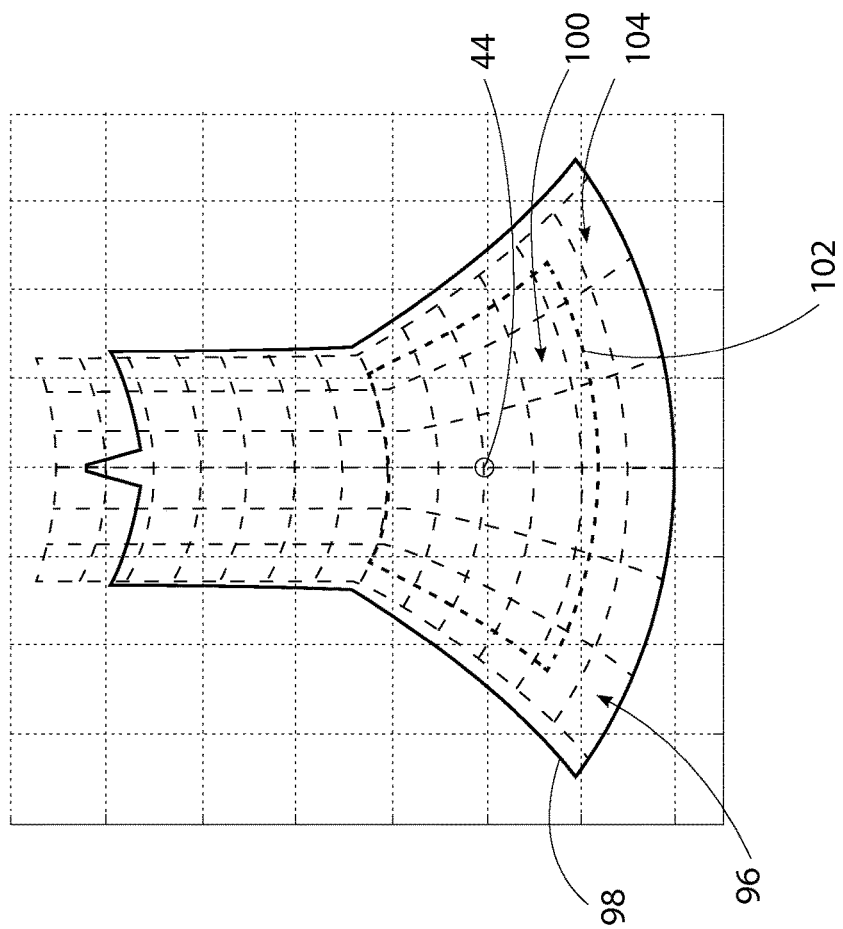
FIGS. 6-9 are representations of movement of the aircraft refueling boom through the field of movement volume in response to manual input to the manual control device where the boom movements are controlled by the control system of this disclosure.

FIG. 6 is a representation of a first situation in which the boom 44 is positioned in the central movement volume 100 within the restricted movement threshold 102. In the central movement volume 100, movement of the boom 44 is unrestricted by the control system 62. The boom 44, the position of which is being monitored by the control system 62, is at a first position within the central movement volume 106. The joystick 64 is not subject to any control input from the operator. Because no control input is applied by the operator to the joystick 64, the boom 44 remains at its current position represented in FIG. 6.

Figure 7:
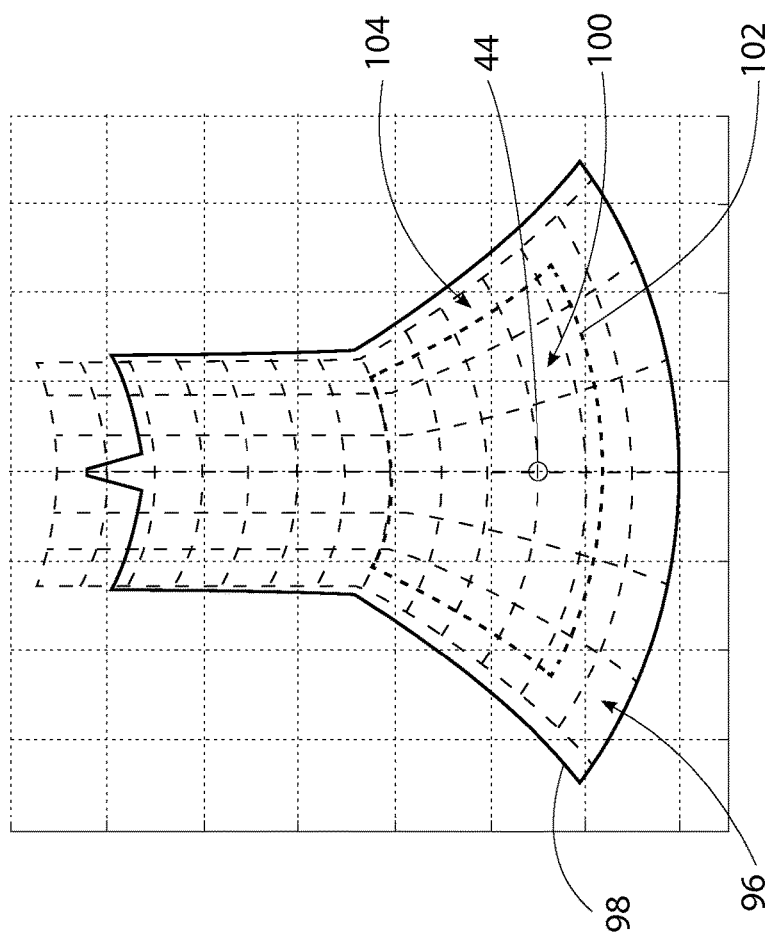

FIG. 7 is a representation of a second situation in which the boom operator moves the joystick 64 forwardly, sending an input control signal 68 to the control system 62. In response to the forward movement of the joystick 64, the boom 44 moves downwardly in the central movement volume 100 to a second position below the first position of the boom 44 represented in FIG. 6. Because the position of the boom 44 represented in FIG. 7 is still in the central movement volume 100 where movement of the boom is unrestricted by the control system 62, the control system 62 fully implements the movement of the boom 44 in response to the input control signal 68 received from the joystick 64.

Figure 8:
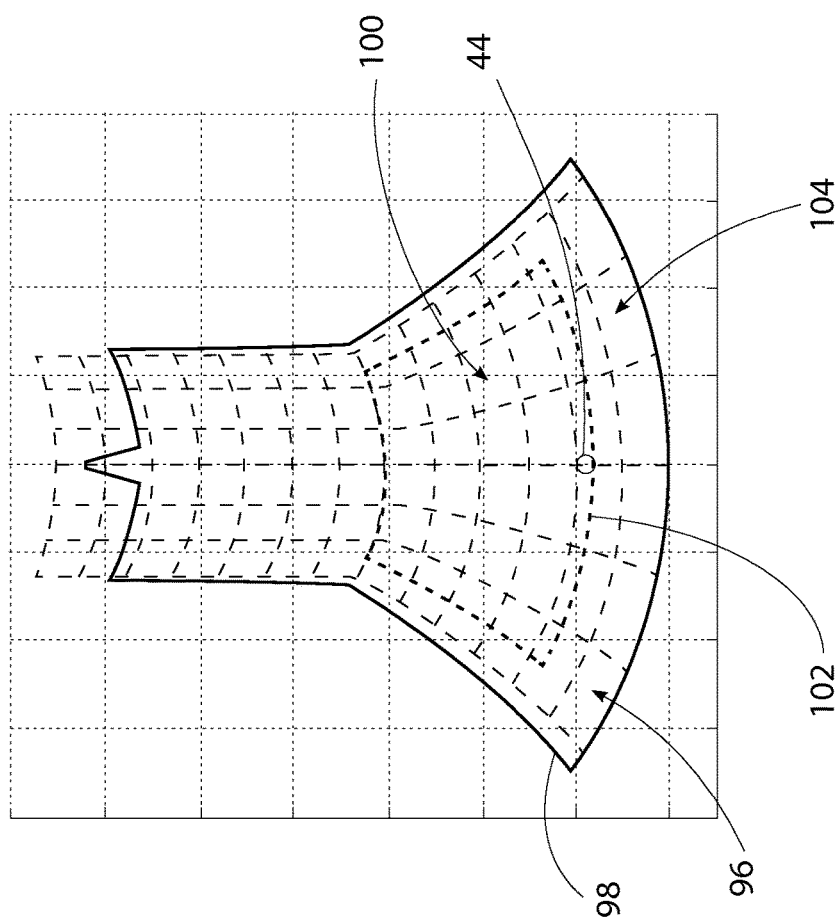

FIG. 8 is a representation of further downward movement of the boom 44 in the central movement volume 100 resulting from the continued presence of the joystick 64 in its pushed forward position. As represented in FIG. 8, the boom 44 has been moved from its first position represented in FIG. 6 to a third position within the central movement volume 100 adjacent the restricted movement threshold 102. Because the input control signal 68 produced by the pushed forward position of the joystick 64 continues to be applied to the control system 62, the boom 44 continues to move downwardly in response to the input control signal 68 at a same rate within the central movement volume 100. Because the boom 44 continues to be moved in the central movement volume 100, the input control signal 68 resulting from the pushed forward position of the joystick 64 is fully implemented without any reduction in response from the control system 62.

Figure 9:
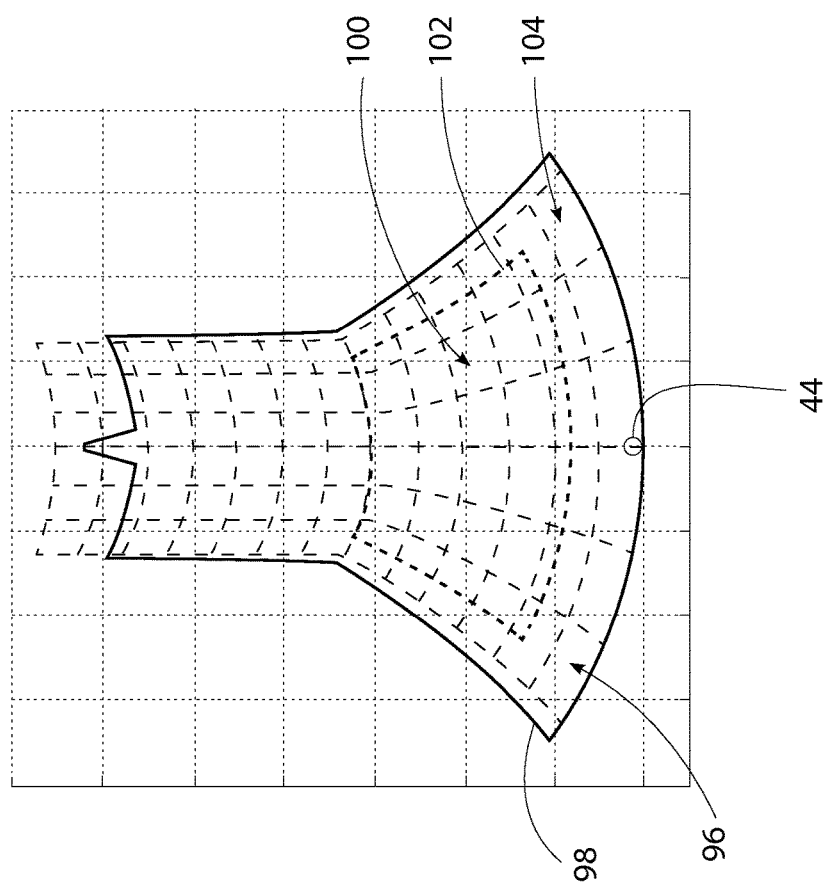

FIG. 9 is a representation of movement of the boom 44 to a fourth position. A continued positioning of the joystick 64 in the pushed forward position by the boom operator directs the boom 44 to move in the same direction of movement as represented in FIGS. 7 and 8 with the boom 44 moving through the restricted movement threshold 102 and through the restricted movement volume 104 toward the movement limit threshold 98.

In response to the boom 44 moving through the restricted movement threshold 102 and into the restricted movement volume 104, the control system 62 reduces the response of the boom 44 to the pushed forward position of the joystick 64 by the boom operator. Thus, if the boom operator's pushed forward positioning of the joystick 64 is continued, the control system 62 controls the boom 44 to respond more slowly. If the boom operator wishes to move the boom 44 in the same direction at the same rate, the operator must increase a magnitude of the manual input to the joystick 64 and push the joystick further forward.

The control system 62 progressively slows down the movement of the boom 44 through the restricted movement volume 104 as the boom 44 approaches the movement limit threshold 98 surrounding the total field of movement volume 96. Should the boom operator continue to operate the joystick 64 to control movement of the boom 44 to the movement limit threshold 98, the control system 62 takes over complete control of the boom 44 and stops the movement of the boom at the movement limit threshold 98. In this way, the soft limits control system 62 restricts the movement of the boom 44 to contain the boom in the total field of movement volume 96 where the boom is spaced well away from its mechanical limits, the tanker aircraft fuselage and/or a tanker aircraft structure, preventing potential impact of the boom 44 with the tanker aircraft fuselage or structure.

In order to insure that the control system 62 prevents the boom 44 from moving beyond the total field of movement volume and potentially reaching its mechanical limits, contacting the tanker aircraft 42 or structures of the tanker aircraft, the control system 62 monitors both the position of the boom 44 in the total field of movement volume 96 and the rate or speed of movement at which the boom 44 is controlled to move from the central movement volume 100, across the restricted movement threshold 102 and into the restricted movement volume 104. By the control system 62 monitoring the position of the boom 44 in the total field of movement volume 96 and the rate at which the boom moves from the central movement volume 100, through the restricted movement threshold 102 and into the restricted movement volume 104, the control system 62 can determine the force and amount of time required to overcome the inertia of the mass of the moving boom 44 and control stopping of the boom movement as the boom 44 reaches the movement limit threshold 98. For example, when the control system 62 senses the boom 44 moving at a first rate or speed of movement through the central movement volume 100, across the restricted movement threshold 102 and into the restricted movement volume 104, the control system 62 controls the actuators 76 to move the rudders and elevator 56 to positions relative to the boom 44 where the rudders and elevator 56 exert a first force against the inertia of the boom 44 for a first period of time to ensure that the movement of the boom 44 through the restricted movement volume 104 stops before the boom reaches the movement limit threshold 98. When the control system 62 senses the boom moving at a second rate or speed of movement through the central movement volume 100, through the restricted movement threshold 102 and into the restricted movement volume 104 where the second rate or speed of movement is greater than the first rate or speed of movement, the control system 62 controls the actuators 76 to move the rudders and elevator 56 to positions relative to the boom 44 where the rudders and elevator 56 exert a second force that is larger than the first force against the inertia of the boom movement for a second period of time to ensure that the boom 44 stops moving through the restricted movement volume 104 before the boom reaches the movement limit threshold 98.

By sensing both the position of the boom 44 in the total field of movement volume 96 and the rate or speed of movement of the boom through the central movement volume 100, across the restricted movement threshold 102 and into the restricted movement volume 104, the control system 62 ensures that a sufficient stopping force in sufficient time will be exerted against the inertia of the boom moving through the restricted movement volume 104 to stop the movement of the boom 44 when the boom reaches the movement limit threshold 98.

Although the operation of the boom soft limits 62 controlling the rate of movement of the boom 44 has been described above with reference to FIGS. 6-9 for downward movement of the boom through the total field of movement volume 96, it should be understood that the boom soft limits 62 control left and right movements of the boom 44, upward and downward movements of the boom 44 and combinations of these movements through the total field of movement volume 96 in the same manner.

As various modifications could be made in the construction of the aircraft refueling boom soft limits control and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A refueling boom system, comprising:
a refueling boom;
a control system operatively connected with the refueling boom, the control system being operable in response to input control signals received by the control system to control movements of the refueling boom in a central movement volume relative to the refueling boom and a restricted movement volume relative to the refueling boom, the restricted movement volume extending around the central movement volume and a movement limit threshold extending around the restricted movement volume, the control system being operable to sense a position of the refueling boom in the central movement volume and to sense a rate of movement of the refueling boom in the central movement volume, the control system being operable to sense a position of the refueling boom in the restricted movement volume and to sense a rate of movement of the refueling boom in the restricted movement volume;
a manual control device operatively connected with the control system, the manual control device being operable to send the input control signals to the control system in response to manual manipulation of the manual control device;
the control system being operable to control the movement of the boom in response to only the input control signals when the control system senses the position of the boom in the central movement volume; and,
the control system being operable to control movements of the boom in response to the input control signals and feedback output signals generated by the control system when the control system senses the position of the boom in the restricted movement volume.

2. The refueling boom system of claim 1, further comprising:
the control system being operable to control the movement of the refueling boom in a first manner in response to the control system sensing a first rate of movement of the refueling boom and the control system being operable to control the movement of the boom in a second manner in response to the control system sensing a second rate of movement of the refueling boom.

3. The refueling boom system of claim 2, further comprising:
the first manner being different from the second manner; and,
the first rate of movement being different from the second rate of movement.

4. The refueling boom system of claim 1, further comprising:
the control system being operable to limit movements of the boom to movements inside the movement limit threshold.

5. The refueling boom system of claim 1, further comprising:
the refueling boom being attached to a tanker aircraft.

6. The refueling boom system of claim 5, further comprising:

at least two rudders and one elevator on the refueling boom and operatively connected with the control system; and, the control system being operable to move the rudders and elevator in response to input control signals received by the control system.

7. A refueling boom system comprising:

a refueling boom that is movable in a total field of movement volume, the total field of movement volume having a first volume and a second volume;

an actuator operatively connected to the refueling boom, the actuator being operable to move the refueling boom in the total field of movement volume;

a control system operatively connected to the boom and operatively connected to the actuator, the control system being operable to sense a rate of movement of the boom in the total field of movement volume, and the control system being operable to control the actuator to move the boom in the total field of movement volume in response to the rate of movement of the boom sensed by the control system;

a manual control device operatively connected with the control system, the manual control device being operable to send input control signals to the control system in response to manual manipulation of the manual control device;

the control system being operable to control the actuators to move the refueling boom in response to the input control signals;

the control system being operable to sense a position of the refueling boom in the first volume when the refueling boom is positioned in the first volume and the control system being operable to sense a position of the refueling boom in the second volume when the refueling boom is positioned in the second volume;

the control system being operable to control the actuator to move the refueling boom in response to only the input control signals when the control system senses the position of the refueling boom in the first volume; and, the control system being operable to control the actuator to move the refueling boom in response to the input control signals and in response to a feedback output signal generated by the control system when the control system senses the position of the refueling boom in the second volume.

8. The refueling boom system of claim 7, further comprising:

the control system being operable to control the actuator to move the refueling boom in a first manner in response to the control system sensing a first rate of movement of the boom and the control system being operable to control the actuator to move the refueling boom in a second manner in response to the control system sensing a second rate of movement of the boom.

9. The refueling boom system of claim 8, further comprising:

the first manner being different from the second manner; and, the first rate of movement being different from the second rate of movement.

10. The refueling boom system of claim 9, further comprising:

the control system being operable to sense a position of the refueling boom in the first volume when the refueling boom is positioned in the first volume and the control system being operable to sense a position of the refueling boom in the second volume when the refueling boom is positioned in the second volume.

11. The refueling boom system of claim 7, further comprising:

the first volume and the second volume being separate.

12. The refueling boom system of claim 7, further comprising:

the control system being operable to limit movement of the refueling boom to inside the total field of movement volume.

13. The refueling boom system of claim 7, further comprising:

the refueling boom being attached to a tanker aircraft.

14. The refueling boom system of claim 13, further comprising:

at least two rudders and one elevator on the boom; and, the actuator being operatively connected with the rudders and elevator and being operable to move the rudders and elevator to move the refueling boom.

15. The refueling boom system of claim 1, further comprising:

the refueling boom supporting a nozzle; and, the nozzle being configured for communication with a refueling receiver of a separate aircraft.

16. The refueling boom system of claim 1, further comprising:

the manual control device being a joystick.

17. The refueling boom system of claim 1, further comprising:

the central movement volume having a conical configuration.

18. The refueling boom system of claim 7, further comprising:

the refueling boom supporting a nozzle; and, the nozzle being configured for communication with a refueling receiver of a separate aircraft.

19. The refueling boom system of claim 7, further comprising:

the manual control device being a joystick.

20. The refueling boom system of claim 7, further comprising:

the first volume having a conical configuration.

* * * * *